(12) United States Patent
Kim

(10) Patent No.: US 6,498,721 B1
(45) Date of Patent: Dec. 24, 2002

(54) TWO-WAY DISPLAY NOTEBOOK COMPUTER

(76) Inventor: Young S. Kim, 1612 Corlevia, Los Altos, CA (US) 94024

( * ) Notice: Subject to any disclaimer, the term of this patent is extended or adjusted under 35 U.S.C. 154(b) by 0 days.

(21) Appl. No.: 09/648,170

(22) Filed: Aug. 25, 2000

Related U.S. Application Data

(60) Provisional application No. 60/151,215, filed on Aug. 27, 1999.

(51) Int. Cl.[7] .................................................. H05K 7/16
(52) U.S. Cl. .................... 361/681; 312/223.2; 345/905; 248/917
(58) Field of Search ................................ 361/680–687, 361/724–727; 312/223.1, 223.6; 345/169, 905; 248/917–926

(56) References Cited

U.S. PATENT DOCUMENTS 6,259,597 B1 * 7/2001 Anzai et al. ................ 361/683
6,262,716 B1 * 7/2001 Raasch ........................ 345/168
6,266,235 B1 * 7/2001 Leman ........................ 361/681

* cited by examiner

*Primary Examiner*—Darren Schuberg
*Assistant Examiner*—Hung Van Duong

(57) ABSTRACT

A notebook computer has a body cover which is hinged to a support rotatably carried by the body. The cover has a main display which in a closed position overlies the body and in an open position pivots and rotates the main display away from the body.

A further embodiment of the present invention includes an auxiliary display which is hinged to the cover on the side opposite the main display. In a first, closed position the auxiliary display lies parallel with the cover and in a second, open position maintains an angle with the cover.

6 Claims, 6 Drawing Sheets

TWO-WAY DISPLAY NOTEBOOK COMPUTER

RELATED APPLICATIONS

This application claims priority to U.S. Provisional Application Serial No. 60/151,215 filed Aug. 27, 1999.

BRIEF DESCRIPTION OF THE INVENTION

This invention relates generally to notebook computers, and more particularly to notebook computers having a two-way or dial display.

BACKGROUND OF THE INVENTION

Notebook computers generally have a main body which houses the processor and associated electronic components, disk drives, cursor control and switches. A keyboard is carried by the upper surface of the main body, and a cover is suitably hinged to the body whereby in its closed position it covers and protects the keyboard. The cover includes a flat screen display such as an active matrix or LCD display. In the closed position the display overlies the keyboard. In the open position it generally faces the keyboard whereby the operator views the display as he performs various tasks commanded by the keyboard and cursor control.

One advantage of having a notebook computer is that it can be easily carried by the user for making presentations. In many applications, the user wishes to display data, drawings, pictures, graphs or other information to others. Presently, the information can be viewed by others if they sit on the same side of the computer as the user observes the selected information, data, etc. Another method of displaying information to others is to connect the computer to a video projector and project the data onto a screen or wall. However, the use of a projector defeats the advantage of portability of the laptop since the projector must be carried along with the notebook computer or arrangements must be made to have a projector available for each presentation.

It would be advantageous to be able to make a presentation, display information, etc. to individuals sitting on the opposite side of a table or desk.

OBJECTS AND SUMMARY OF THE PRESENT INVENTION

It is an object of the present invention to provide a notebook or laptop computer having the ability of providing displays on opposite faces of the cover or lid while protecting the display and the keyboard when the cover is closed.

It is another object of the present invention to provide a notebook or laptop computer in which the cover can be opened and positioned to present the main display to individuals sitting opposite the operator, and in which an auxiliary display is provided to display duplicate information to the operator.

There is provided a notebook computer having a body and a cover which is hinged to a support rotatably carried by the body. The cover has a main display which in a closed position overlies the body and in an open position pivots and rotates the main display away from the body.

A further embodiment of the present invention includes an auxiliary display which is hinged to the cover on the side opposite the main display. In a first, closed position the auxiliary display lies parallel with the cover and in a second, open position maintains an angle with the cover.

BRIEF DESCRIPTION OF THE DRAWINGS

The foregoing and other objects of the invention will be more clearly understood from the following description when read in conjunction with the accompanying drawings of which.

DESCRIPTION OF PREFERRED EMBODIMENT

Figure 1:
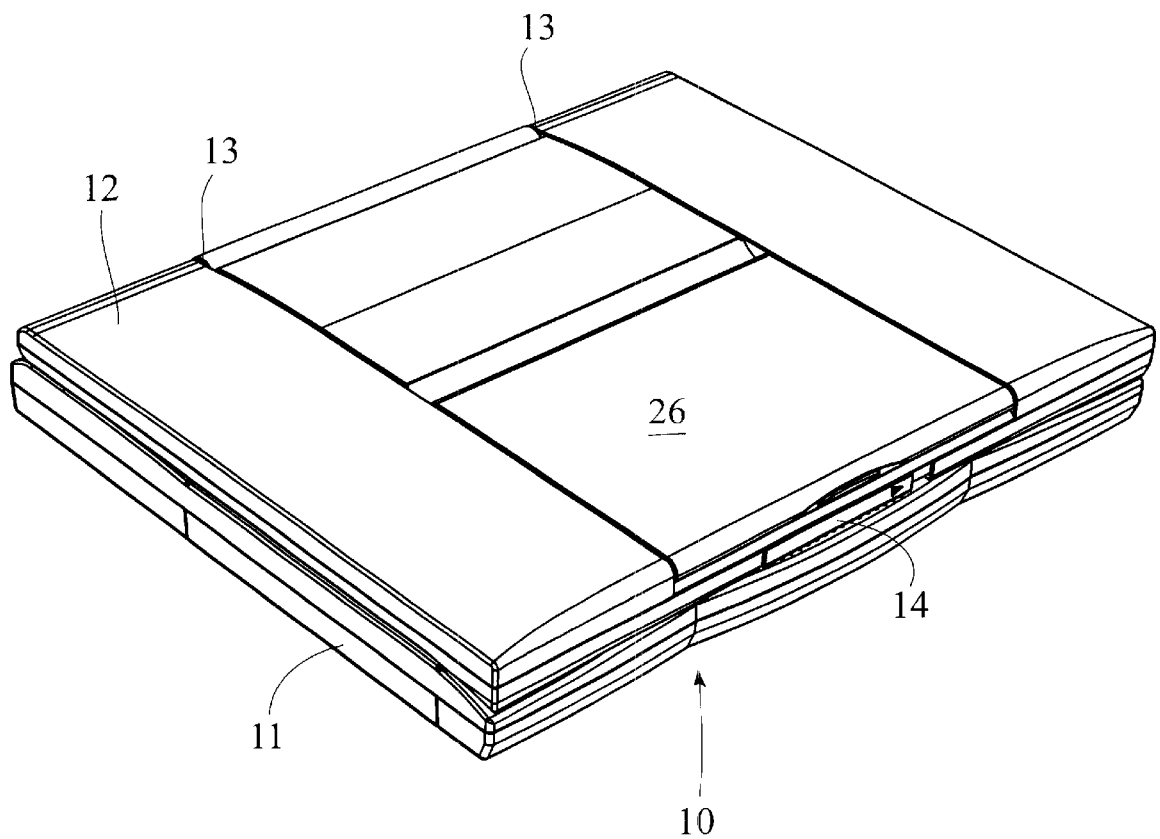
FIG. 1 is a perspective view of the notebook computer with the cover closed.

FIG. 1 shows a laptop or notebook computer 10 of the present invention. Notebook computer 10 includes a body 11 with a cover 12 that folds about the hinge 13 located at the back of computer 10 and is locked in closed position by a suitable latching mechanism 14. Body 11 houses the actual computer components, such as processors, disk drives, modem, microphone, speakers, etc.

Figure 2:
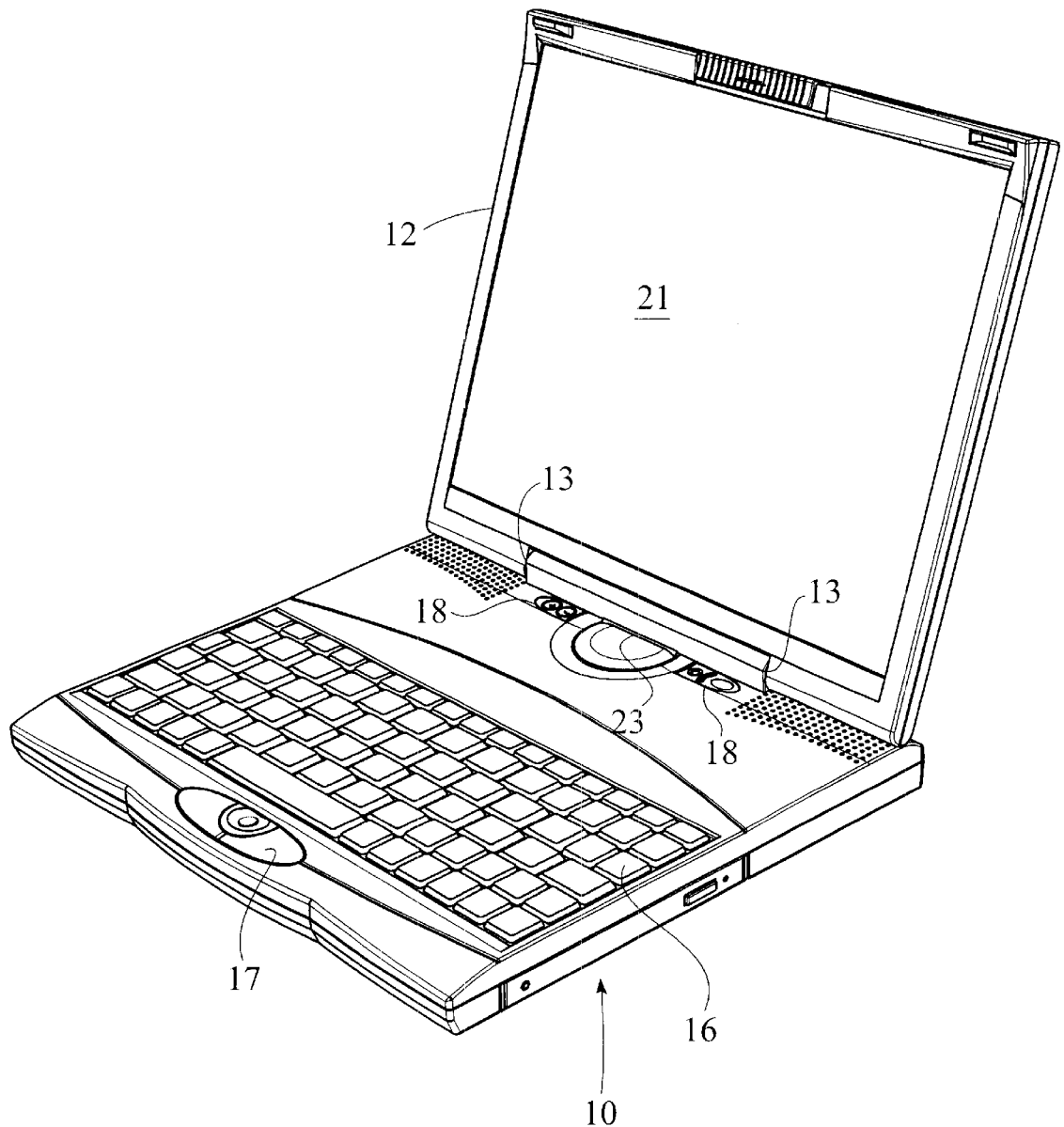
FIG. 2 is a front perspective view of the notebook computer with the cover open and the main display facing the operator.
Figure 3:
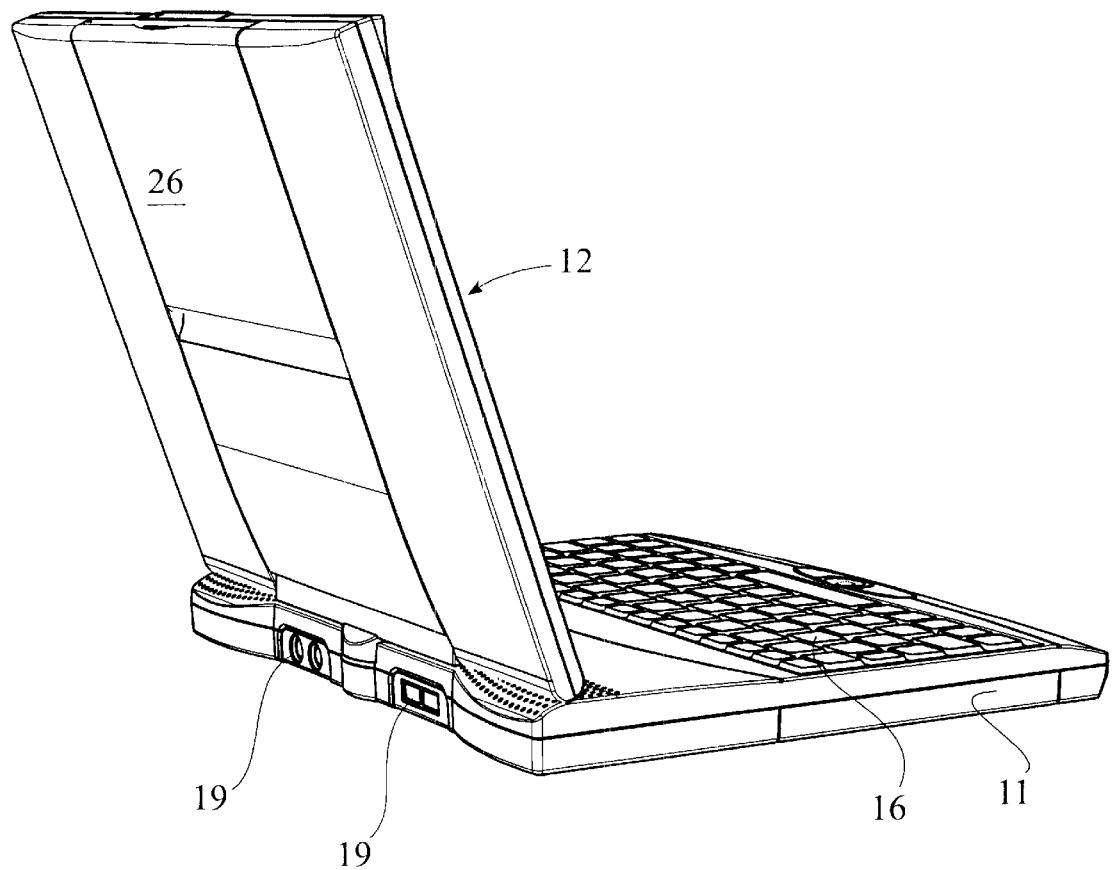
FIG. 3 is a rear perspective view of the notebook computer with the cover open and showing the auxiliary display folded into the back of the cover.

FIGS. 2 and 3 show notebook computer 10 with cover 12 in a raised position. On the bottom of cover 12 is a main display 21, for example a matrix or liquid crystal display. Display 21 is protected by cover 12 when in a lowered position. On top of body 11 is a keyboard 16, cursor control 17, and switches and controls 18. In the rear of body 11 are interface ports 19, such as serial and USB. Cover 12 overlies and protects keyboard 16, cursor control 17, and switches and controls 18, as well as protecting main display 21. In accordance with another feature of the present invention, the rear of cover 12 houses an auxiliary display 26, which lies against cover 12 when in the closed position, as shown in FIGS. 1 and 3.

When cover 12 is in the lowered position, latching mechanism 14 releases cover 12, which pivots about hinge 13, so that cover 12 reveals main display 21 to an operator. When main display 21 is in a raised position and oriented as shown in FIG. 2 the operator and immediately adjacent observers have a view of the images on main display 21, but observers across from the operator cannot see the images.

Figure 4:
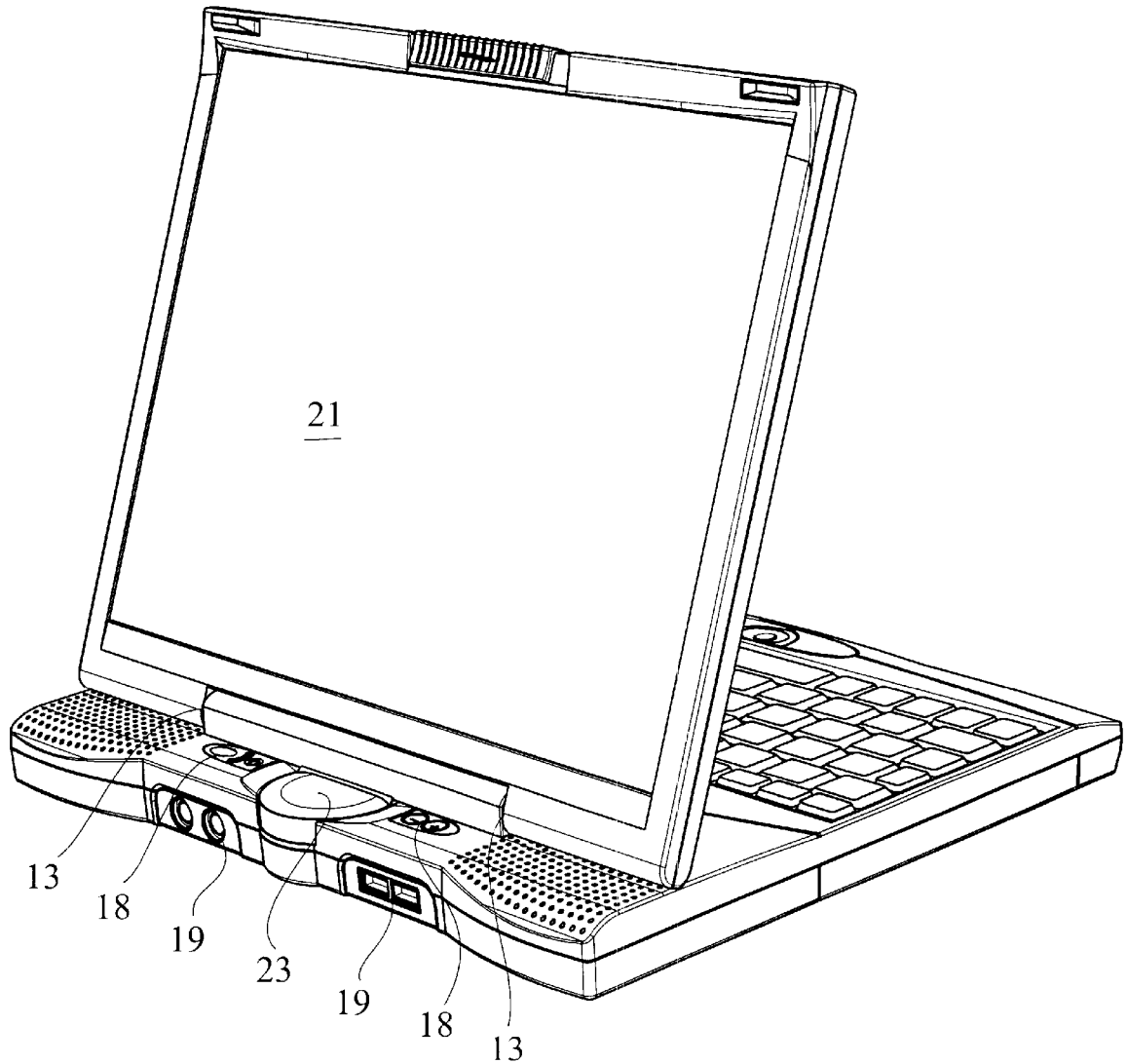
FIG. 4 is a rear perspective view of the notebook computer with the cover open and rotated to present information to others sitting opposite the operator.

In order for observers across from operator to view images, main display 21 rotates about a rotatable joint 23 to face an observer across from operator, as shown in FIG. 4. Main display 21 also pivots about hinge 13 for a better viewing angle for observer. This enables the operator to make a presentation to others without the aid of a projector or the inconvenience of having the others crowd around the operator to view the display from the same side as the operator.

Figure 5:
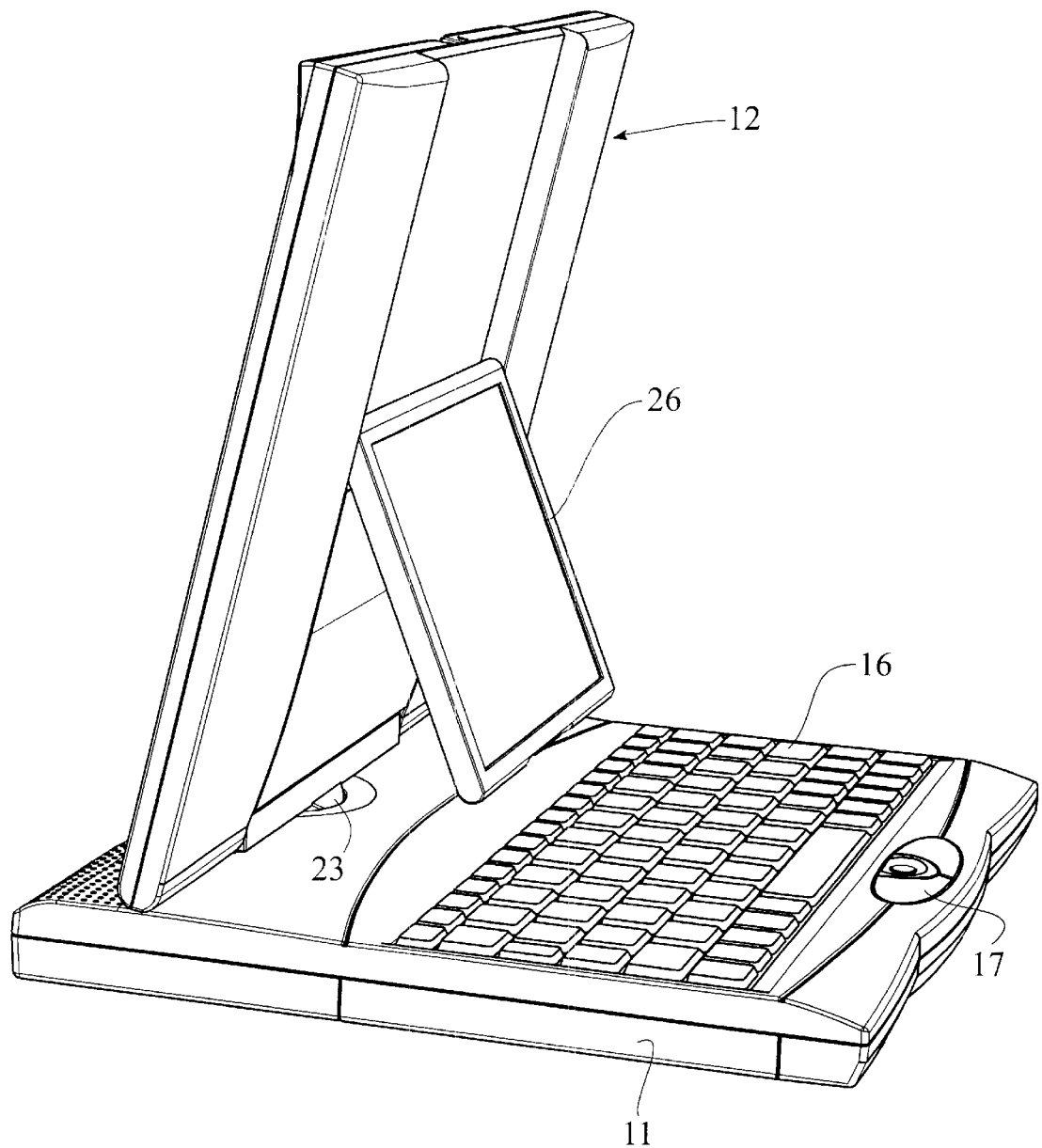
FIG. 5 is a front perspective view of the notebook computer with the cover on in the position of FIG. 4 showing the auxiliary display unfolded to provide the operator a display of the information being displayed on the main display.

Auxiliary display 26 pivots to an open position so that operator can see the images appearing on main display 21 without realigning cover 12, as shown in FIG. 5. Auxiliary display 26 is a matrix or liquid crystal display, for example. In one embodiment auxiliary display 26 shows a reduced version of the images appearing on main display 21. In another embodiment auxiliary display 26 shows different images from those appearing on main display 21. Auxiliary display 26 screen is protected when it is in the closed position.

Figure 6:
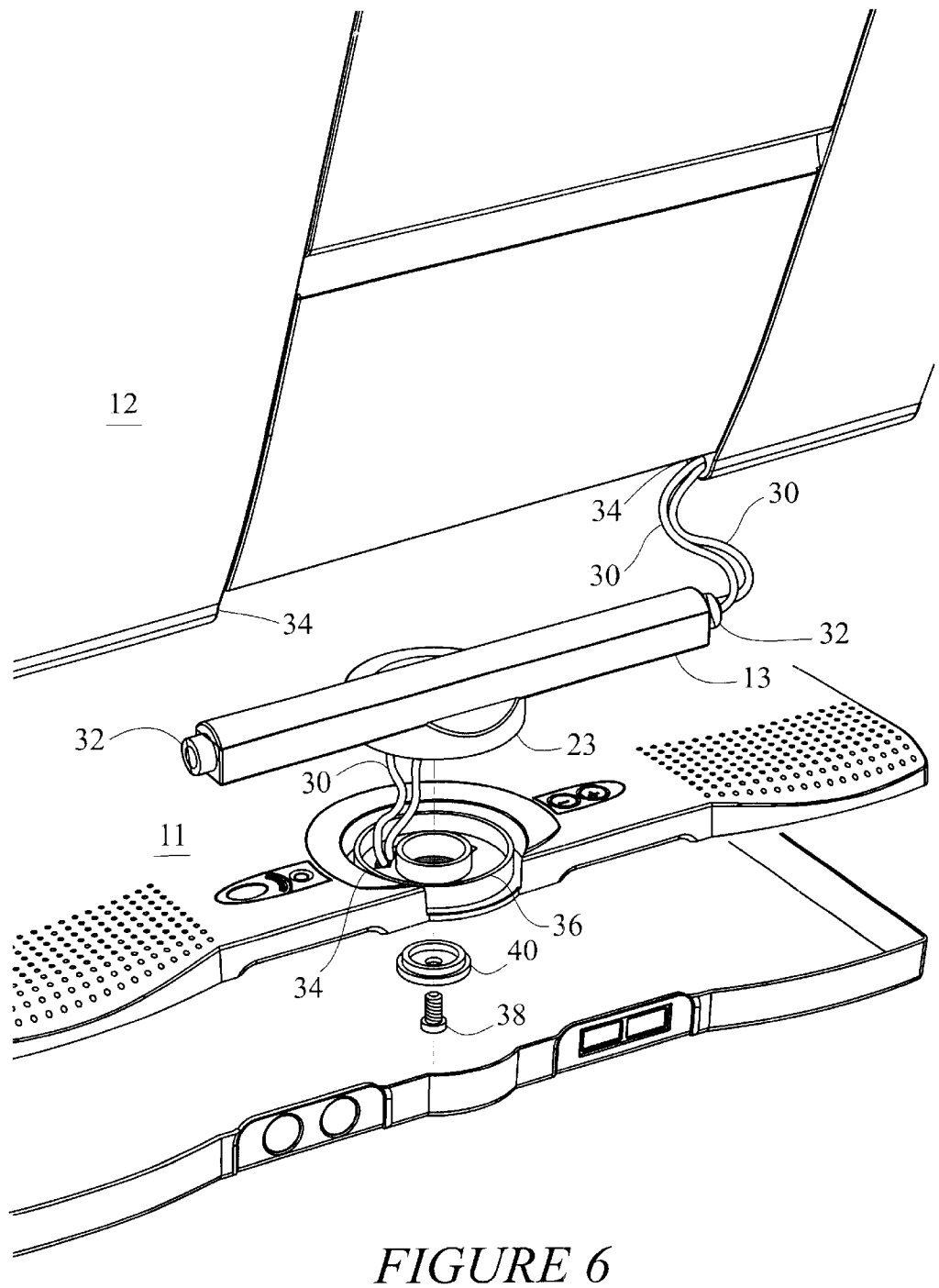
FIG. 6 is an exploded perspective view of the rotatable hinge coupling the display and notebook computer.

FIG. 6 shows cover 12 removed from hinge 13. In one embodiment hinge 13 is integral with rotatable joint 23. Power and data lines 30 connect cover 12 with body 11 through hinge 13 and rotatable joint 23. Lines 30 enter body 11 through a slot 34. Slot 34 is in a socket 36 and is long enough to allow free movement for lines 30 while cover 12 rotates about rotatable hinge 23. Receptors 34 of cover 12 slidably receive the ends 32 of hinge 13 and enable cover 12 to pivot about hinge 13. Rotatable joint 23 fits into socket 36 and is secured with screw 38 and cap 40 from the underside of socket 36, within body 11. Other embodiments include a ball and socket joint.

There has been provided a versatile notebook computer particularly useful for persons wishing to make presentations to others.

The foregoing description, for purposes of explanation, used scientific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled the art to best utilize the invention and various embodiments with various modifications as are suited to the particular use contemplated. It is intended that the scope of the invention be defined by the following claims and their equivalents.

What is claimed is:

1. A notebook computer having a body, a cover which is hinged to a support rotatably carried by the body, the cover having a main display which in a closed position overlies the body and in an open position pivots and rotates with said support so that the main display can be positioned for viewing from different angles, and an auxiliary display secured to the cover on the side opposite the main display and which in a first, closed position lies parallel with the cover and in a second, open position maintains an angle between the auxiliary display and the cover.

2. The notebook computer of claim 1 wherein the cover pivots from a first, closed position over the body to a second, open position perpendicular to the first position and rotates about a joint while remaining perpendicular to the first position.

3. The notebook computer of claim 2 wherein the cover rotates through an angle from 1 to 180 degrees.

4. A notebook computer having a body, a cover which is hinged to a support rotatably carried by the body, the cover having a main display which in a closed position overlies the body and in an open position pivots away from the body and is rotatable with said support so that the display can be positioned for viewing from different directions and an auxiliary display which is secured to the cover on the side opposite the main display and in a first, closed position lies parallel with the cover and in a second, open position maintains an angle between the auxiliary display and the cover.

5. The notebook computer of claim 4 wherein the cover pivots from a first, closed position over the body to a second, open position at an angle with respect to the first position and rotates with said support while maintaining said angle.

6. The notebook computer of claim 5 wherein the cover rotates through an angle from 1 to 180 degrees.

* * * * *